United States Patent [19]
Weakly

[11] 3,712,635
[45] Jan. 23, 1973

[54] STRAIGHT LINE SUSPENSION MECHANISM FOR HILLSIDE COMBINE

[75] Inventor: Marlin Earle Weakly, Moline, Ill.
[73] Assignee: Deere & Company, Moline, Ill.
[22] Filed: Aug. 14, 1970
[21] Appl. No.: 63,696

[52] U.S. Cl..............280/43.22, 280/6 H, 280/43.23
[51] Int. Cl. ............................................B62d 21/18
[58] Field of Search.......280/43, 43.17, 43.22, 43.23, 280/414.5, 6 R, 6 H, 6.1, 6.11, 124 F; 56/209; 172/240, 327, 328, 483

[56] References Cited

UNITED STATES PATENTS

| | | | |
|---|---|---|---|
| 3,292,714 | 12/1966 | Tsuchiya et al. | 172/328 X |
| 2,788,908 | 4/1957 | Lynd | 280/43.23 X |
| 2,042,489 | 6/1936 | Williams | 280/43.22 X |
| 2,297,992 | 10/1942 | Swim | 280/43.22 X |
| 3,175,522 | 3/1965 | Garber et al. | 172/240 X |
| 3,590,928 | 7/1971 | Mirus | 172/240 |
| 2,780,903 | 2/1957 | Kroll et al. | 56/209 |

FOREIGN PATENTS OR APPLICATIONS

| | | | |
|---|---|---|---|
| 988,184 | 4/1951 | France | 172/483 |

*Primary Examiner*—Leo Friaglia
*Assistant Examiner*—Robert R. Song
*Attorney*—H. Vincent Harsha, Harold M. Knoth, William A. Murray, John M. Nolan and Raymond L. Hollister

[57] ABSTRACT

A suspension linkage for effecting straight line vertical adjustment of the front wheels of a hillside combine. Each wheel is mounted on the forward end of a fore-and-aft extending arm, and a pair of vertical and horizontal links interconnect the rear and intermediate portions, respectively, of each arm with the combine frame. An extensible and retractable hydraulic ram acts between each of the horizontal links and the frame to swing the arms and thereby raise and lower the wheels relative to the frame.

11 Claims, 4 Drawing Figures

INVENTOR.
MARLIN E. WEAKLY

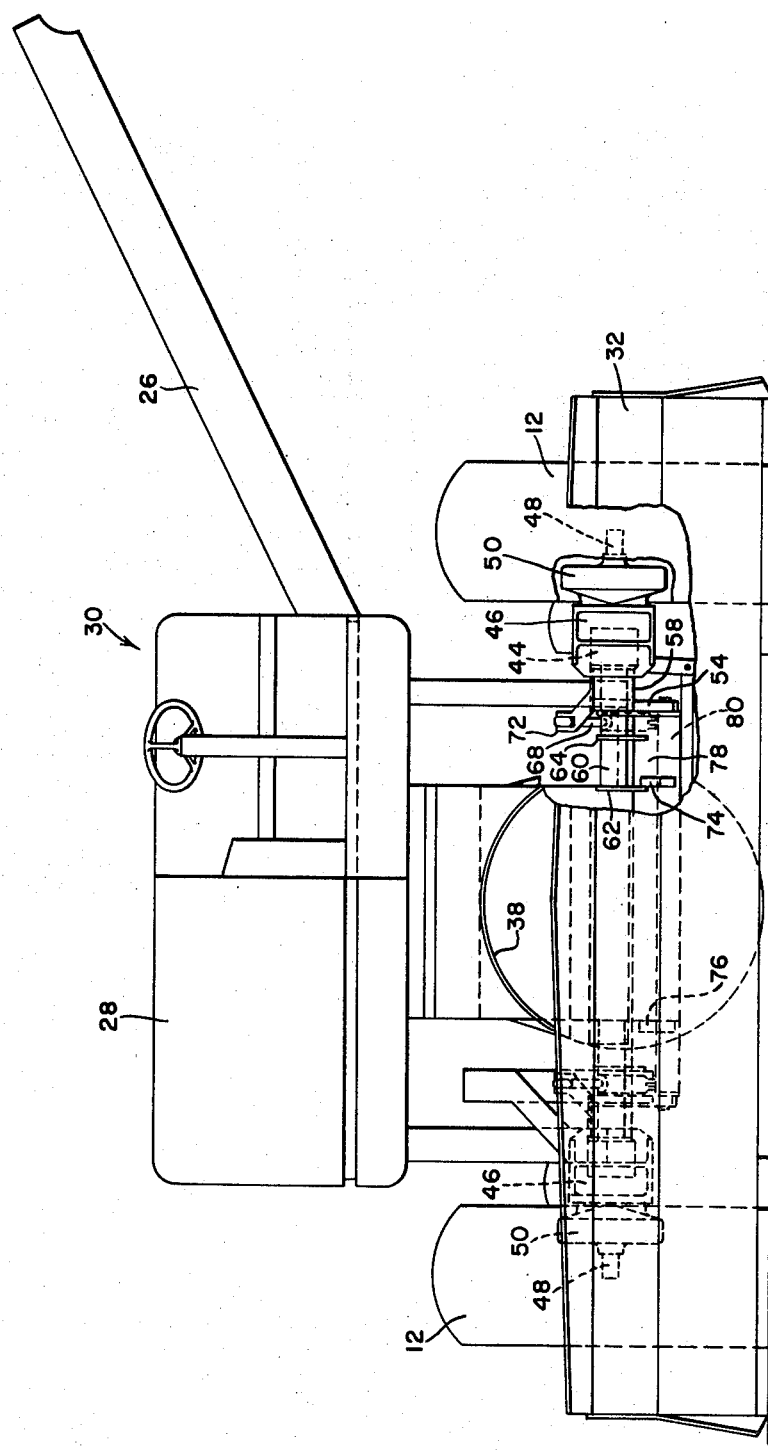

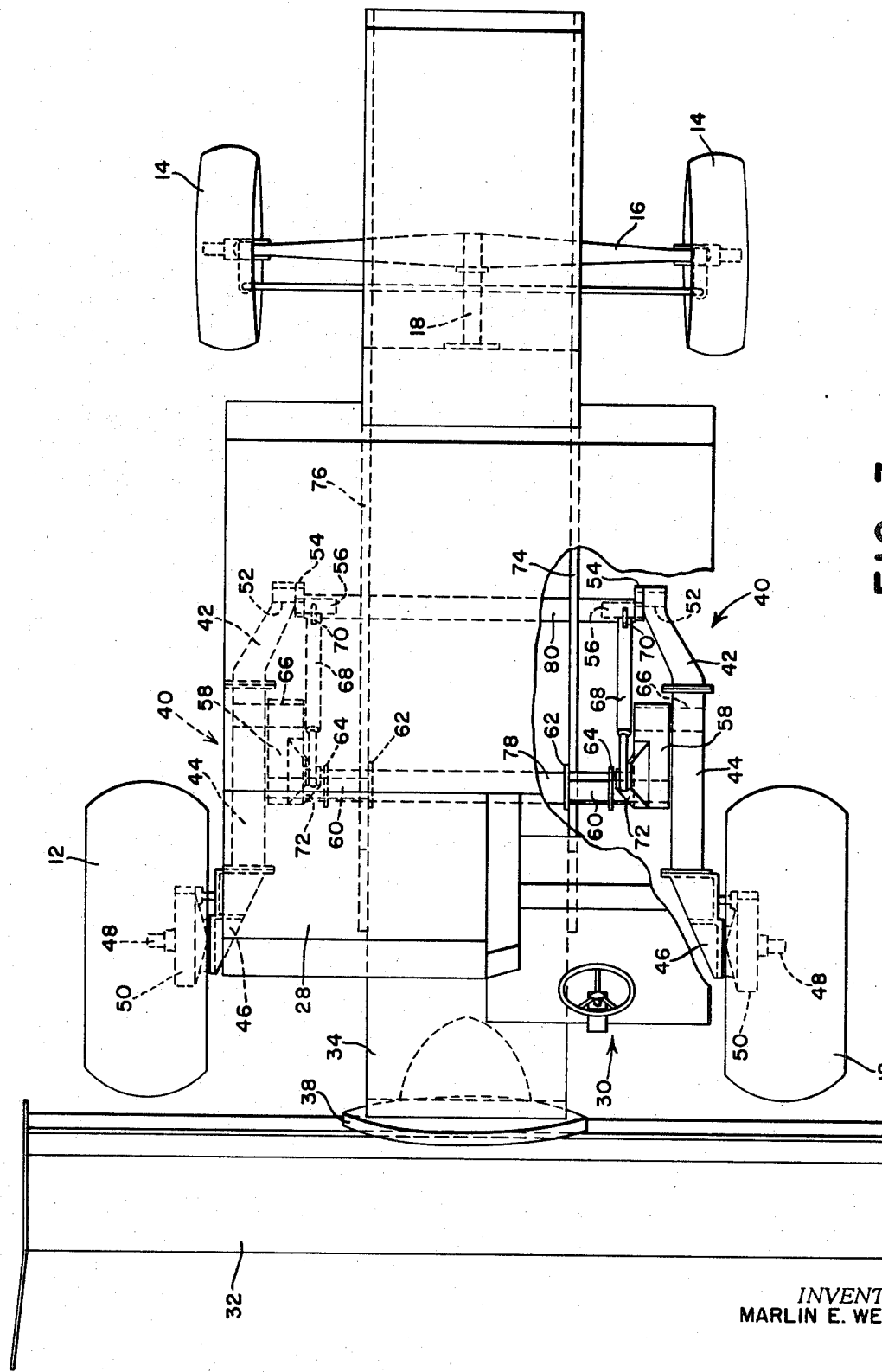

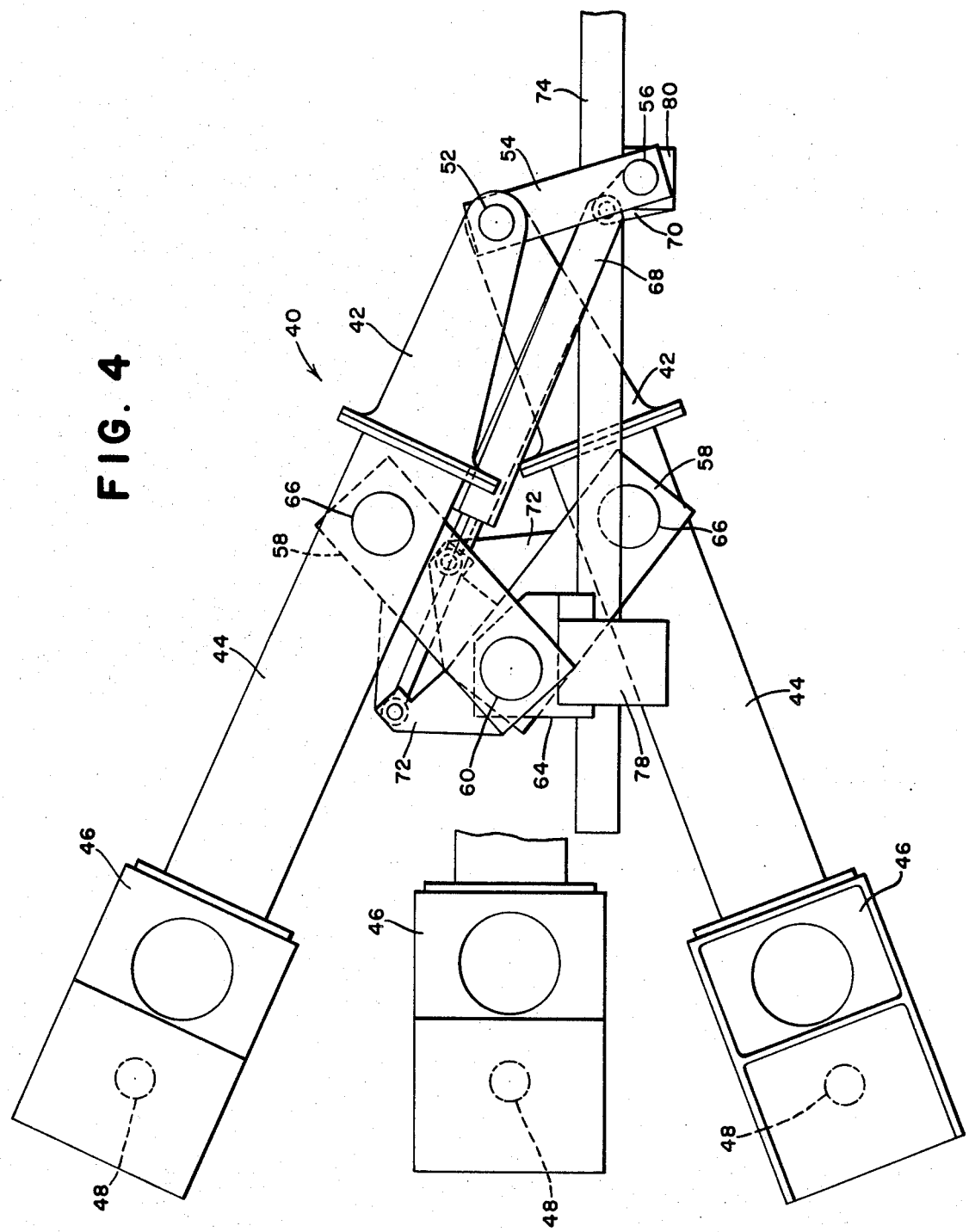

STRAIGHT LINE SUSPENSION MECHANISM FOR HILLSIDE COMBINE

BACKGROUND OF THE INVENTION

The present invention relates generally to a combine or similar vehicle designed for operation on steep slopes, and more particularly to a suspension mechanism for effecting straight line vertical adjustment of the wheels of such a vehicle.

A combine designed for use on hilly terrain conventionally includes a suspension system for the front drive wheels which is effective to maintain the combine body in a constantly level condition irrespective of the slope of the terrain on which it is operated. Such a system is necessary not only to maintain the relatively high center of gravity of the machine at a fairly constant lateral position relative to the wheels and thereby preserve the lateral stability of the machine, but also to maintain the separating system of the combine, the efficiency of which is adversely affected by both fore-and-aft and lateral slope, in a level operating condition. The two principal components of a suspension system of this type comprise, first, a mechanism mounting each of the drive wheels on the combine for relative vertical adjustment, the mechanism conventionally including a pair of oppositely acting hydraulic cylinders for imparting opposite vertical movement to the wheels, and secondly, a sensing system responsive to slope for automatically controlling the hydraulic cylinders, the sensing system cooperating with the hydraulic system on the combine to extend one of the cylinders an amount equal to that which the other is retracted. The present invention is directed toward the former component.

Various types of linkages or mechanisms have been used in the past to adjustably mount the leveling wheels on the frame of a hillside combine. One such type comprises an elongated, transversely extending beam mounted centrally on the combine frame for pivotal movement about a fore-and-aft axis. The drive wheels are mounted at opposite ends of the beam, and are raised and lowered as the beam is swung through a transverse vertical plane. Although such mechanism is generally adequate, certain features render it not entirely satisfactory. For example, as the beam is swung, the outer ends thereof describe an arc, thereby moving the wheels laterally relative to the combine body as well as vertically. Such incidental lateral movement shifts the center of gravity of the combine relative to the wheels, thereby altering the machine's lateral stability as the operating slope is changed. In addition, since the uphill wheel moves inwardly as it is raised, clearance problems are encountered between the wheel and the body, thus necessitating either a wider wheel tread or a narrower body, two undesirable alternatives.

These problems are alleviated somewhat by an alternate leveling mechanism utilizing a pair of fore-and-aft extending beams on opposite sides of the machine, each being pivotally mounted on the frame at its rearward end and carrying one of the drive wheels at its forward end. Although this mechanism eliminates the incidental lateral movement of the wheels present in the transverse beam mechanism, it substitutes therefor incidental longitudinal movement, and, although not so serious as in the former case, the same problems of clearance and stability result from such longitudinal movement as result from the lateral movement of the former mechanism.

SUMMARY OF THE INVENTION

It is, accordingly, an object of the present invention to provide an improved suspension mechanism for mounting the front drive wheels on a hillside combine, and further to provide such a mechanism which eliminates both incidental lateral and longitudinal movement of the wheels as they are adjusted vertically, and thereby eliminates the problems of vehicle stability and clearance existing in the mechanisms of the prior art. More particularly, it is an object of the invention to provide a suspension mechanism for effecting straight line vertical adjustment of the combine wheels.

In pursuance of these and other objects, the present invention comprises, generally, an elongated, fore-and-aft extending arm on each side of the combine and each supporting one of the drive wheels on its forward end, longitudinally movable pivot means connecting the rearward end of each arm to the combine frame, and swingable support means interconnecting an intermediate portion of each arm to the frame. The rear pivot means is movable forwardly to exactly counteract the rearward movement of the wheels as the forward end of the arm is swung through an arc about the pivot means, both above and below the horizontal plane passing therethrough. The intermediate support means connects a point on the arm to the frame for movement of the point through the arcuate path described thereby as the wheel is moved through its extremes of adjustment.

In the preferred embodiment, the longitudinally movable pivot means is carried on the upper end of a vertical link, the link being pivoted at its lower end to the combine frame and swingable through a relatively small arc bisected by a vertical line passing through the lower pivotal mounting. The intermediate support means comprises a fore-and-aft link connected at its forward end to the frame and at its rearward end to an intermediate point on the arm. As the intermediate link is swung through an arc bisected by a horizontal line passing through its connection with the frame, it advances the arm forwardly as it is swung both above and below the line. A pair of hydraulic cylinders act between the intermediate links and the combine frame, the cylinders being actuatable by means of conventional hydraulic and slope sensing means to maintain the combine body in a level condition.

BRIEF DESCRIPTION OF THE DRAWINGS

The preferred embodiment of the invention will be described in conjunction with the accompanying drawings in which:

FIG. 2 is a front elevation view of the combine with portions broken away to more clearly illustrate the invention;

FIG. 3 is a plan view of the combine with portions broken away to more clearly illustrate the invention; and FIG. 4 is an enlarged side view of the mechanism removed from the combine, showing both the raised and lowered positions thereof.

DESCRIPTION OF THE PREFERRED EMBODIMENT

Figure 1:
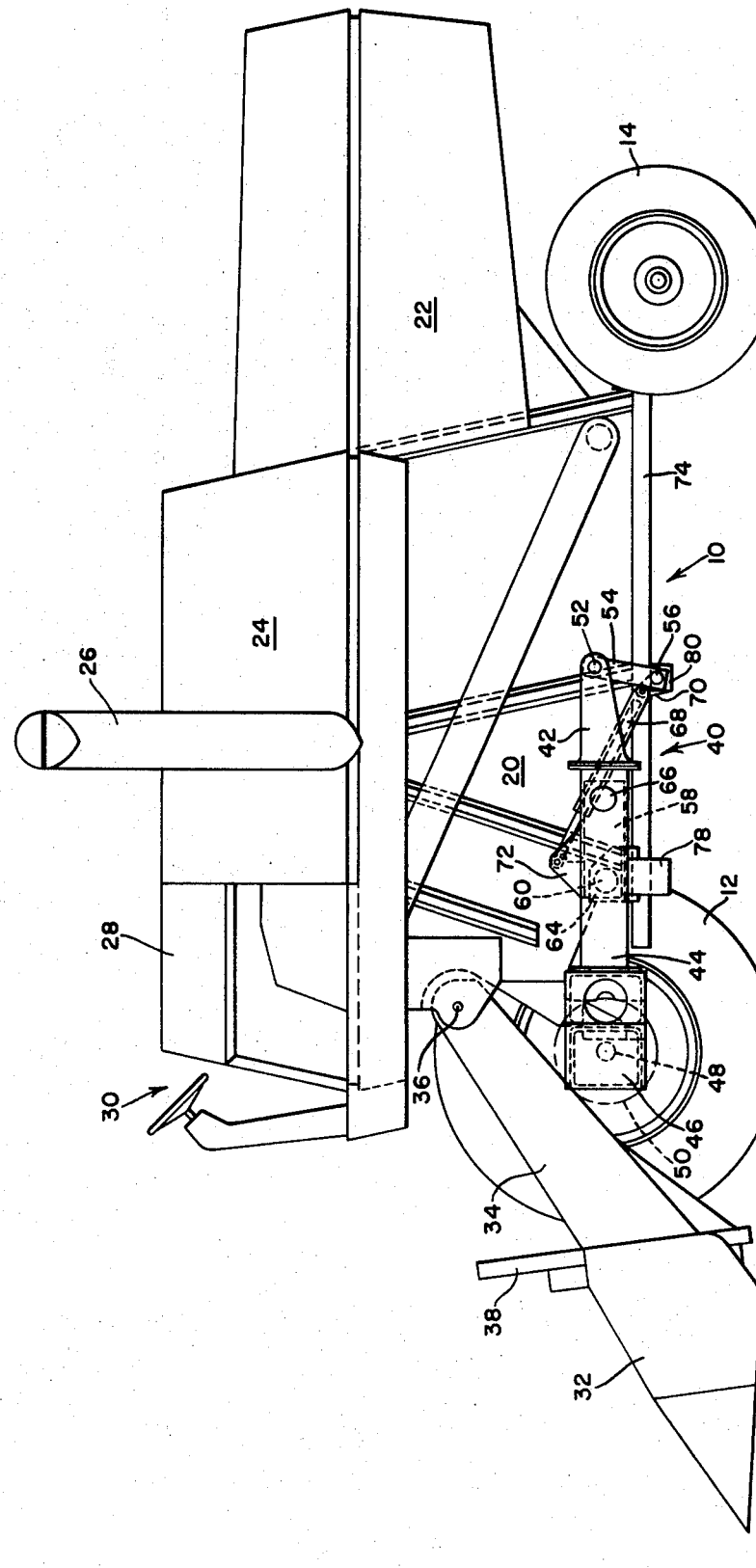
FIG. 1 is a side elevation view of a hillside combine incorporating the suspension mechanism of the present invention.

With the exception of the suspension mechanism of the present invention, the combine illustrated in the drawings is of more or less conventional design and includes a frame structure 10 supported on a pair of large front drive wheels 12 and a pair of smaller rear steerable wheels 14. Included in the frame structure 10 are a pair of left and right, longitudinally extending side rails 74 and 76, respectively, and a pair of front and rear members 78 and 80, respectively, extending transversely across and interconnecting the side rails 74 and 76. The steerable wheels 14 are mounted on opposite ends of a transversely extending beam or rear axle structure 16 which, in turn, is mounted centrally on a fore-and-aft support 18 fixed to the rear portion of the frame structure 10. As the front wheels 12 are adjusted to maintain the combine body in a level condition, in a manner to be hereinafter described, the trailing wheels 14 will move in a corresponding manner to conform to the slope of the ground, thus pivoting the beam 16 about the support 18.

The main body of the combine is carried by the frame structure 10 and includes a threshing and separating system contained generally within the housings 20 and 22, an elevated grain tank 24 having a discharge auger 26 extending outwardly and upwardly therefrom, a compartment 28 housing an internal combustion engine, and an operator's platform 30. Positioned forwardly of the combine body is a header 32 which operates to sever the crop from the field and deliver it rearwardly to the feeder house 34, the latter being pivotally mounted at 36 on the combine body to permit vertical adjustment of the former. The internal conveying mechanism of the feeder house 34 (not shown) receives the crop from the header and delivers it upwardly and rearwardly to the threshing system contained within the housing 20. A large ring and associated header mounting mechanism 38, interposed between the header 32 and the feeder house 34, permits the header to pivot about a fore-and-aft axis relative to the feeder house and thus follow the slope of the terrain as the combine body and attached feeder house are leveled relative thereto. The particular construction of the mounting mechanism 38 is not material to the present invention and is thus not illustrated in detail. A complete disclosure of a suitable mechanism for this purpose is contained in U.S. patent to Kroll et al, U.S. Pat. No. 2,780,903.

The suspension mechanism of the present invention, as is most readily apparent from FIG. 3, is composed of mirror image halves, with that portion of the mechanism on one side of the longitudinal centerline of the combine being an exact, though opposite, reproduction of that portion on the opposite side thereof. In the drawings, like numerals are therefore used to designate analogous elements in the two halves, and in the ensuing description, although reference may be made to only one-half of the mechanism, it is to be understood that the description is analogously applicable to the opposite half as well.

The mechanism includes a pair of fore-and-aft extending arms 40 on either side of the combine body, each arm comprising an inwardly offset rear portion 42, a rectangular cross-sectioned intermediate portion 44, and a wedge-shaped forward portion 46, the portions being connected to form a single rigid unit. A drive mechanism housing or hub 50 is mounted rigidly on the vertical outer wall of the wedge-shaped forward portion 46, for vertical movement therewith. Each drive wheel 12 is carried for rotation on a stub axle 48 extending transversely outwardly from the center of the housing 50. The rear portion 42 of the arm 40 is mounted for vertical pivotal movement on a transverse pin 52 fixed to the upper end of a substantially vertical link 54. The lower end of the link 54 extends adjacent to the outer end of the rear transverse frame member 80 and is pivotally received by a transverse pin 56 fixed to and extending outwardly from the member 80. Supporting the intermediate portion 44 of the arm 40 for arcuate swinging movement relative to the frame 10 is a normally horizontal link 58 pivoted at its forward end on a transverse cylindrical support 60. A pair of inner and outer, upstanding brackets 62 and 64, respectively, are secured to the upper surface of the front transverse frame member 78 and cooperate to hold the support 60 in fixed relation thereto. The rearward end of the horizontal link 58 is connected to the intermediate portion 44 of the arm 40 by means of a transverse cylindrical support 66 fixed to the link 58 and pivotally received by the portion 44. It is thus apparent that the suspension mechanism of the present invention comprises, in effect, a four-bar linkage, consisting of the frame 10, the arm 40, and the vertical and horizontal links 54 and 58, respectively.

Vertical adjustment of the arms 40 is accomplished by a pair of extensible and retractable hydraulic rams 68 acting between a pair of fixed anchor members 70 on the rear transverse frame member 80 and a pair of brackets 72 on the upper surface of the horizontal link 58, each ram actuating one-half of the suspension mechanism. A conventional hydraulic fluid supply system and slope sensing means on the combine cooperate to extend one of the rams 68, thereby raising one of the drive wheels 12, and to retract the other, thereby lowering the other wheel 12, an amount sufficient to maintain the combine in a level condition. These systems, various types of which are well known in the art, form no part of the present invention. As shown in FIG. 4, actuation of the ram 68 causes the rearward end of the link 58, including the support 66, to swing through an arc bisected by a horizontal line passing through the pivotal support 60. This movement is transmitted to the arm 40 through the support 60, resulting in vertical swinging movement of the arm 40 about its rear pivotal connection 52 with the upper end of the vertical link 54. As the link 58 is swung away from its horizontal position, the support 66 is advanced forwardly with respect to the stationary support 60 on the frame, due to the arcuate path described thereby. This forward movement of the support 66, and the resulting forward movement of that portion of the arm 40 receiving the support 66, results in corresponding forward movement of the pivotal connection 52 between the rearward end of the arm 40 and the link 54. The arrangement and proportions of the elements comprising the four-bar linkage are such that the forward movement of the connection 52, imparted by the action of the link 58, is of the required magnitude to just offset the rearward movement of a particular point on the forward end of the arm 40 relative to the connection 52, as the arm is swung from its horizontal position. The drive wheel axle 48 is positioned on the forward end of the arm at this point of vertical straight line movement, as illustrated in FIG. 4, such that the drive wheel 12 mounted thereon is moved through the same straight line as it is adjusted vertically.

A comparison of FIGS. 1 and 4 demonstrates the approximate range of fore-and-aft movement of the pivotal connection 52, between the rearward end of the arm 40 and the vertical link 54, as the arm is moved between its normal, or centered, position and its extreme upper and lower positions. FIG. 1 shows the suspension linkage in the centered position, with the link 54 at the extreme rear of its travel, while FIG. 4 shows the left linkage in a raised position and the right linkage in a lowered position, with the link 54 at the approximate forward extreme of travel in both positions. It is apparent that the arc described by the pin 52 between its fore-and-aft extremes of travel is bisected by a vertical line passing through the lower pivotal connection 56 between the link 54 and frame member 80.

Although the preferred method of effect fore-and-aft movement of the pivotal connection 52 is, as herein disclosed, to mount it on the outer end of a swingable link, it will be apparent to those skilled in the art that various other means could be utilized to accomplish the same result without departing from the scope of the invention. Such alternate means, for example, could comprise a follower on the end of the arm 40 adapted to ride on a horizontal, fore-and-aft rail mounted on the side of the combine.

I claim:

1. In combination with a hillside combine having a frame, a suspension mechanism comprising: a fore-and-aft extending arm; a ground-engaging wheel mounted on the forward end of the arm for rotation about a transverse axis; transverse pivot means connecting the rearward end of the arm to the frame for swinging movement above and below the transverse horizontal plane containing the axis of the pivot means, whereby the wheel is swingable relative to the pivot means through an arc bisected by said transverse horizontal plane; means mounting the pivot means on the frame for movement along a substantially horizontal fore-and-aft path; a fore-and-aft extending rigid link mounted at its forward end on the frame for swinging movement about a transverse axis disposed horizontally between the axes of the wheel and the pivot means and substantially lying on the transverse horizontal plane containing the axis of the pivot means, and mounted at its rearward end on the arm forwardly of the axis of the pivot means for pivotal movement about a transverse axis, the link being swingable above and below said transverse horizontal plane and being operative to move the arm and the pivot means forwardly relative to the frame in response to movement of the arm about the pivot means away from the transverse horizontal plane containing the axis of the pivot means, and rearwardly relative to the frame in response to movement of the arm about the pivot means toward said transverse horizontal plane, the elements being so constructed and arranged that the fore-and-aft movement of the wheel relative to the pivot means as the arm is swung about the pivot means is substantially identical in magnitude though directionally opposite to the simultaneous fore-and-aft movement of the pivot means relative to the frame resulting from the action of the link, whereby the axis of the wheel follows a substantially straight and vertical line relative to the frame as the arm is swung about the pivot means.

2. The invention defined in claim 1 wherein said means mounting said transverse pivot means on said frame comprises a vertically extending rigid link, one end of said link being pivotally mounted on said frame and the other end of said link supporting said transverse pivot means.

3. The invention defined in claim 2 wherein the substantially horizontal fore-and-aft path followed by said transverse pivot means comprises the arc described by the end of said link supporting said transverse pivot means, said arc being bisected by a vertical line passing through the end of said link pivotally mounted on said frame.

4. The invention defined in claim 2 wherein said one end of said vertical link is disposed below said other end of said link.

5. The invention defined in claim 1 including power means acting between the frame and the arm for swinging the latter above the pivot means.

6. The invention defined in claim 5 wherein the power means comprises an extensible and retractable hydraulic ram connecting the frame and the rigid link to swing the latter relative to the former.

7. In combination with a vehicle having a frame, a suspension mechanism comprising: a fore-and-aft extending arm; a ground-engaging wheel mounted on one end of the arm for rotation about a transverse axis; transverse point means connecting the other end of the arm to the frame for swinging movement toward and away from a transverse, generally horizontal plane containing the axis of the pivot means, whereby the wheel is swingable through an arc relative to the pivot means; means mounting the pivot means on the frame for movement along a fore-and-aft path substantially parallel to said generally horizontal plane whereby the pivot means is movable forwardly as the arm is swung away from said plane and movable rearwardly as the arm is swung toward said plane, to maintain the axis of the wheel on a substantially straight line perpendicular to said plane as the arm is swung about the pivot means; and means for moving the pivot means fore and aft to maintain the wheel on said straight line in response to movement of the arm about the pivot means, comprising a fore-and-aft extending rigid link mounted at its forward end on the frame for swinging movement about a transverse axis disposed horizontally between the axes of the wheel and the pivot means and substantially lying on said generally horizontal plane containing the axis of said pivot means, and mounted at its rearward end on the arm for pivotal movement about a transverse axis, the link being swingable toward and away from said plane and being operative to move the arm and the pivot means forwardly relative to the frame in response to movement of the arm about the pivot means away from said generally horizontal plane, and rearwardly relative to the frame in response to movement of the arm about the pivot means toward said plane.

8. The invention defined in claim 7 wherein said means mounting the transverse pivot means on the frame comprises a vertically extending rigid link, one end of said link being pivotally mounted on said frame and the other end of said link supporting said transverse pivot means.

9. The invention defined in claim 8 wherein the fore-and-aft path followed by said transverse pivot means comprises the arc described by the end of said link supporting said transverse pivot means, said arc being bisected by a vertical line passing through the end of said link pivotally mounted on said frame.

10. In combination with a vehicle having a frame, a suspension mechanism comprising: a fore-and-aft extending arm; a ground-engaging wheel rotatably mounted on one end of the arm; pivot means connecting the other end of the arm to the frame for swinging movement toward and away from a transverse plane containing the axis of the pivot means; means mounting the pivot means on the frame for movement along a path generally paralleling said transverse plane whereby the pivot means is movable toward a substantially straight line perpendicular to said plane and containing the wheel as the arm is swung away from said plane and movable away from said substantially straight line as the arm is swung toward said plane, to maintain the axis of the wheel on said substantially straight line as the arm is swung about the pivot means; and means responsive to movement of the arm about the pivot means away from said plane to move the pivot means toward said substantially straight line, and responsive to movement of the arm about the pivot means toward said plane to move the pivot means away from said substantially straight line, to maintain the axis of the wheel on said substantially straight line as the arm is swung about the pivot means, said means responsive comprising a rigid link mounted at one end on the frame for pivotal movement about an axis disposed between the axes of the wheel and the pivot means and on said transverse plane containing the axis of said pivot means, the link extending toward the pivot means and being pivotally mounted at its other end on the arm between the axis of the wheel and the pivot means.

11. In combination with a vehicle having a frame, a suspension mechanism comprising: a fore-and-aft extending arm; a ground-engaging wheel rotatably mounted on one end of the arm; pivot means connecting the other end of the arm to the frame for swinging movement toward and away from a transverse plane containing the axis of the pivot means; means mounting the pivot means on the frame for movement along a path generally paralleling said transverse plane whereby the pivot means is movable toward a substantially straight line perpendicular to said plane and containing the wheel as the arm is swung away from said plane and movable away from said substantially straight line as the arm is swung toward said plane, to maintain the axis of the wheel on said substantially straight line as the arm is swung about the pivot means; and means responsive to movement of the arm about the pivot means away from said plane to move the pivot means toward said substantially straight line, and responsive to movement of the arm about the pivot means toward said plane to move the pivot means away from said substantially straight line, to maintain the axis of the wheel on said substantially straight line as the arm is swung about the pivot means.

* * * * *